Patented Dec. 12, 1922.

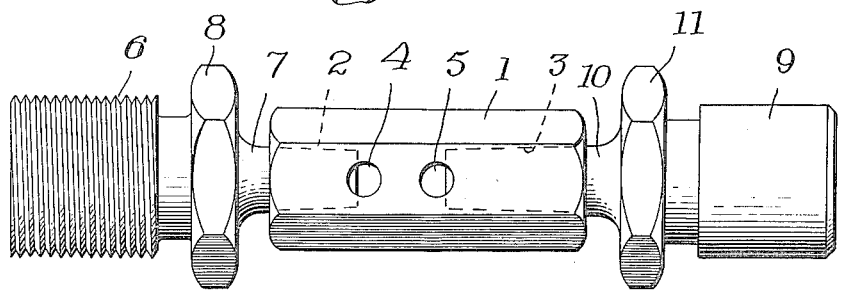
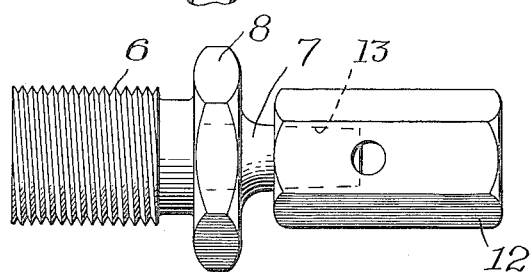

1,438,634

UNITED STATES PATENT OFFICE.

HARRY F. CLIFFORD AND ROBERT H. C. GRUNEWALD, OF WORCESTER, MASSACHUSETTS, ASSIGNORS TO JOHN BATH & COMPANY, INC., OF WORCESTER, MASSACHUSETTS, A CORPORATION OF MASSACHUSETTS.

GAUGE.

Application filed July 14, 1919. Serial No. 310,591.

*To all whom it may concern:*

Be it known that we, HARRY F. CLIFFORD and ROBERT H. C. GRUNEWALD, both citizens of the United States, residing at Worcester, in the county of Worcester and Commonwealth of Massachusetts, have invented a new and useful Improvement in a Gauge, of which the following, together with the accompanying drawings, is a specification.

Our invention relates to gauges, particularly of the type employed to determine the accuracy of screwthreads, or to test the size of openings.

The object of our invention is to provide a hand gauge by means of which a large number of pieces of work can be quickly and accurately tested.

Gauges of this general type, as heretofore constructed, have usually comprised a handle provided with a gauging portion having the correct form of the thread or opening to be tested. It is necessary to employ a high grade steel for the gauging portion and when the weight of the handle is added to that of the gauging portion the total weight of the gauge makes it awkward to handle, owing to the weight of the overhanging portion of the handle.

By our invention we propose to provide a gauge in which the weight is reduced to a minimum by providing a detachable handle of very light material separate from the gauging portion so that the weight of the overhanging portion is practically negligible. We further provide a gauge embodying means for protecting the gauging portion against injury from careless handling.

In the drawings, Figure 1 is a plan view of a gauge embodying our invention, and Figure 2 is a view similar to Fig. 1, showing a modification thereof.

Similar reference characters refer to similar parts in the different figures.

Referring to Fig. 1, the gauge comprises a handle portion 1 that is hexagonal in form and is preferably composed of a very light metal, such as aluminum, or of any durable material that is very light in weight and preferably non-corroding. The handle 1 is provided at its ends with coaxial openings 2 and 3 that are slightly tapered, and holes 4 and 5 extending transversely through the ends of the openings 2 and 3. A thread gauging or testing portion 6, preferably composed of tool steel, is provided with a tapered shank 7 that is adapted to fit within the opening 2, and an intermediate hexagonal portion 8 with its straight sides extending beyond the periphery of the threads, for a purpose to be hereinafter described. The shank 7 extends part way into the hole 4 so that a suitable tool may be inserted in the hole 4 in order to remove the gauge 6. A cylindrical hole gauging or testing portion 9 is similarly provided with a tapered shank 10 that is located in the opening 3 and with an intermediate hexagonal portion 11.

In applying a gauge constructed in accordance with our invention to measure threads or openings, it is apparent that the handle 1 is balanced by the gauging portions of approximately equal weight at the ends thereof, and that there is less tendency for the operator to permit the gauge to move downwardly as it is applied to the thread or to the opening, which it is desired to measure. The operator is thereby enabled to apply the gauge with a certain delicacy of touch that could not be obtained if a gauge having a heavy bulky handle were to be employed. In addition, the handle portion being composed of non-corroding material prevents rusting from the moisture of the operator's hand, and the difference in the coeffiicents of heat expansion of the dissimilar metals in the gauge practically eliminates expansion of the gauging portions, due to the heat of the operator's hand. Another advantageous feature of our gauge lies in the fact that the hexagonal portion 8 permits the ready application of a tool to remove it from a tight fit, prevents the gauge from rolling when laid on a flat surface, and also prevents the gauging portion from coming into contact with the surface.

In Fig. 2 there is shown a short handle 12 which is provided with but a single opening 13 and a thread gauge 6. In using a gauge of this sort there is practically no tendency whatever for the gauge to bind in the opening due to the overhanging weight of the handle 12.

It is obvious that other types of gauges may be employed in connection with a light weight handle of the same general type as that described in the foregoing, without departing from the spirit and scope of our invention. We desire therefore that only such limitations be imposed thereon as may come within the scope of the appended claim.

We claim,

A gauge comprising an elongated handle provided with a central longitudinal opening and a detachable gauging member provided at its respective ends with a shank received in said opening, and a gauging portion and having an intermediate angular portion of greater outside dimensions than the said gauging portion and the handle.

Dated July 3, 1919.

HARRY F. CLIFFORD.
ROBERT H. C. GRUNEWALD.

Witnesses:
PENELOPE COMBERBACH,
GEO. H. KENNEDY, Jr.